(12) United States Patent
Peterson

(10) Patent No.: US 8,762,555 B1
(45) Date of Patent: Jun. 24, 2014

(54) SYSTEM AND METHOD FOR PROVIDING FILTERED GEOSPATIAL ASSETS

(71) Applicant: Google Inc., Mountain View, CA (US)

(72) Inventor: Bret E. Peterson, Lafayette, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/953,997

(22) Filed: Jul. 30, 2013

(51) Int. Cl.
*G06F 15/16* (2006.01)

(52) U.S. Cl.
USPC ............... 709/229; 709/230; 709/231

(58) Field of Classification Search
None
See application file for complete search history.

(56) References Cited

U.S. PATENT DOCUMENTS

| | | | |
|---|---|---|---|
| 2006/0242111 A1* | 10/2006 | Goldstein | 707/1 |
| 2008/0307498 A1* | 12/2008 | Johnson et al. | 726/3 |
| 2011/0205229 A1 | 8/2011 | Jagadev et al. | |
| 2012/0038633 A1* | 2/2012 | Clark et al. | 345/419 |
| 2013/0238599 A1* | 9/2013 | Burris | 707/722 |

OTHER PUBLICATIONS

Peterson et al., U.S. Appl. No. 13/483,215, filed May 30, 2012, System and Method for Sharing Geospatial Assets between Local Devices.
Peterson et al., U.S. Appl. No. 13/924,886, filed Jun. 24, 2013, System and Method for Providing Geospatial Assets.

* cited by examiner

*Primary Examiner* — Djenane Bayard
(74) *Attorney, Agent, or Firm* — Dority & Manning, P.A.

(57) ABSTRACT

A computer-implemented method for providing filtered geospatial assets may include providing access to a reference geospatial asset including geospatial data and receiving a filter request to associate a filter with the reference geospatial asset. The filter request may include at least one filter parameter associated with limiting access to a portion of the geospatial data. In addition, the method may include receiving an access request to access a filtered version of the reference geospatial asset using an access point associated with the filter and applying the filter to the reference geospatial asset to generate the filtered version of the reference geospatial asset. The filtered version may provide access to only a portion of the geospatial data contained within the reference geospatial asset.

20 Claims, 6 Drawing Sheets

SYSTEM AND METHOD FOR PROVIDING FILTERED GEOSPATIAL ASSETS

FIELD

The present subject matter relates generally to geospatial assets and, more particularly, to a system and method for providing filtered geospatial assets to a user of a GIS client.

BACKGROUND

Geographic Information Systems (GIS) clients capture, store, manage and display data elements according to geospatial coordinates. For example, mapping clients, such as Google Maps, render maps, satellite imagery and other geospatial data over a two-dimensional surface. Similarly, earth-browsing clients, such as Google Earth, render satellite imagery, terrain, vectors and other geospatial data over a three-dimensional geometry representing the Earth's surface. Thus, a user of Google Maps or Google Earth may navigate across the two-dimensional surface or three-dimensional geometry while data and images corresponding to geographical locations are presented to the user.

In many instances, it may be desirable to serve a geospatial asset, such as a 2-D map or 3-D globe, to multiple groups of end users without providing each end user group access to the entire geospatial asset or access to the same portions of the geospatial asset. For instance, for legal, strategic or other reasons, an administrator, manager or owner of a geospatial asset may only want to share with a particular end user group the high-resolution data contained within the asset that is pertinent to that group. Conventionally, to provide such particularized access to the geospatial data, it was necessary to create and maintain individual geospatial assets for each end user group, which is quite expensive and both time- and space-intensive.

SUMMARY

Aspects and advantages of embodiments of the invention will be set forth in part in the following description, or may be obvious from the description, or may be learned through practice of the embodiments.

In one aspect, the present subject matter is directed to a computer-implemented method for providing filtered geospatial assets. The method may generally include providing access to a reference geospatial asset including geospatial data and receiving a filter request to associate a filter with the reference geospatial asset. The filter request may include at least one filter parameter associated with limiting access to a portion of the geospatial data. In addition, the method may include receiving an access request to access a filtered version of the reference geospatial asset using an access point associated with the filter and applying the filter to the reference geospatial asset to generate the filtered version of the reference geospatial asset. The filtered version may provide access to only a portion of the geospatial data contained within the reference geospatial asset.

In another aspect, the present subject matter is directed to a system for providing filtered geospatial assets. The system may generally include one or more computing devices having one or more processors and associated memory. The memory may store instructions that, when executed by the processor(s), configure the computing device(s) to receive a first filter request to associate a first filter with a reference geospatial asset and a second filter request to associate a second filter with the reference geospatial asset. The reference geospatial asset may include geospatial data. The first filter request may include at least one filter parameter associated with limiting access to a first portion of the geospatial data. The second filter request may include at least one filter parameter associated with limiting access to a second portion of the geospatial data. The instructions stored in the memory may also configure the computing device(s) to receive an access request to access a filtered version of the reference geospatial asset. The access request may be associated with an access point associated with one of the first filter request or the second filter request. In addition, the instructions stored in the memory may configure the computing device(s) to apply the first filter or the second filter to the reference geospatial asset based on the access request to generate the filtered version of the reference geospatial asset. The filtered version may provide access to only a portion of the geospatial data contained within the reference geospatial asset.

In a further aspect, the present subject matter is directed to a tangible, non-transitory computer-readable medium storing computer-executable instructions that, when executed by one or more processors, cause the processor(s) to perform specific operations. The operations may generally include storing a reference geospatial asset. The reference geospatial asset may include geospatial data and may be associated with a filter. The filter may include at least one filter parameter for limiting access to a portion of the geospatial data. The operations may also include receiving an access request to access a filtered version of the reference geospatial asset. The access request may be associated with an access point associated with the filter. In addition, the operations may include applying the filter to the reference geospatial asset to generate the filtered version of the reference geospatial asset. The filtered version may provide access to only a portion of the geospatial data contained within the reference geospatial asset.

Other exemplary aspects of the present disclosure are directed to systems, apparatus, non-transitory computer-readable media, user interfaces and devices for providing filtered geospatial assets.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art, are set forth in the specification, which makes reference to the appended figures, in which.

DETAILED DESCRIPTION

Figure 1:
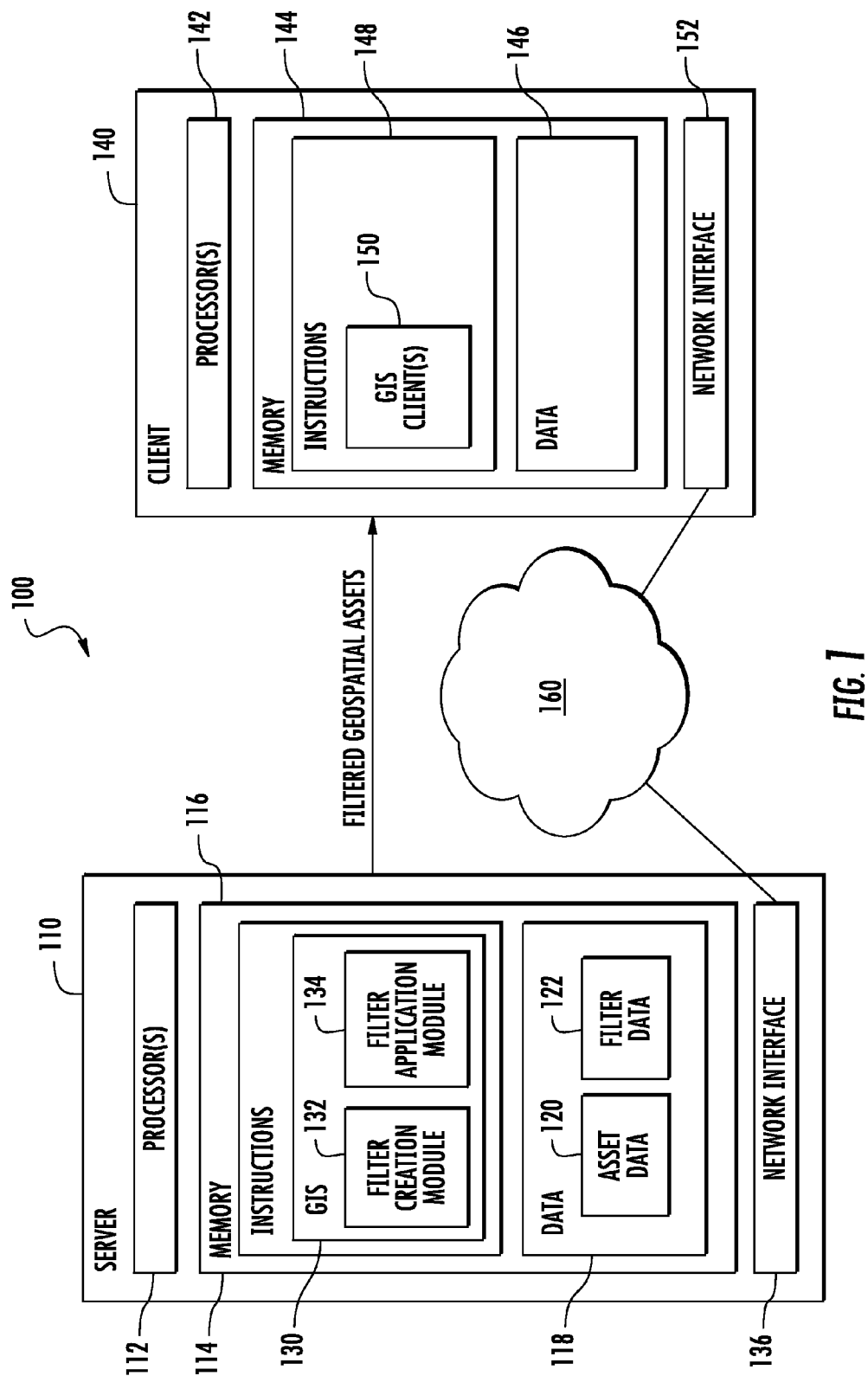
FIG. 1 illustrates a schematic diagram of one embodiment of a system for providing filtered geospatial assets in accordance with aspects of the present subject matter.

Reference now will be made in detail to embodiments of the invention, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the invention. For instance, features illustrated or described as part of one embodiment can be used with another embodiment to yield a still further embodiment. Thus, it is intended that the present subject matter cover such modifications and variations as come within the scope of the appended claims and their equivalents.

In general, the present subject matter is directed to a system and method for providing filtered geospatial assets to a user of a Geographic Information System (GIS) client. Specifically, in several embodiments, the disclosed system and method may allow a user to associate one or more asset filters with a particular reference geospatial asset (i.e., a base asset to which one or more filters are applied). Each asset filter may be configured to limit and/or restrict access to a portion of the geospatial data included within the reference geospatial asset (e.g., by limiting the amount of data served to the client device). As a result, the disclosed system and method may allow for filtered versions of a reference geospatial asset to be dynamically created as they are being served to end users.

For instance, an administrator may control access to a 3-D globe containing geospatial data that provides for an entire geographic region (e.g., an entire country) to be rendered at a high resolution level. However, for legal, strategic or other reasons, the administrator may desire for a particular group of end users to only be capable of viewing a selected region of interest (ROI) within the geographic region (e.g., a specific city within the country) at the high resolution level, with the remainder of the geographic region being available for viewing only at a lower, default resolution. In such case, the administrator may create an asset filter for the 3-D globe that includes a resolution level for the selected ROI that is higher than the default resolution. Thereafter, when one of the end users from the group requests access to the 3-D globe, the corresponding asset filter may be applied in a manner that prevents such user from viewing portions of the geographic region outside the ROI at a resolution higher than the default resolution level. For instance, the geospatial data associated with rendering the portions of the geographic region outside the ROI at resolution levels above the default resolution may be disregarded or otherwise not served to the user's device. Accordingly, when the user attempts to view the geographic region on his/her device at the high resolution level, the portions of the geographic region outside the ROI may be blurred or otherwise not available.

Each asset filter may be associated with filter parameters that are used to filter access requests received by the server for accessing the reference geospatial asset. For instance, the filter parameters may specify the resolution level at or below which all requests for geospatial data are accepted (e.g., the default resolution level). The filter parameters may also specify the resolution level associated with one or more ROIs and/or any other set(s) of geospatial data (e.g., an asset layer(s)) at or below which requests for data are accepted (e.g., a maximum resolution). For instance, a polygon may be utilized to define a specific ROI. In such an embodiment, an associated filter parameter may specify the resolution level at which requests for data that are included within or overlap the specific ROI are to be accepted.

Additionally, it should be appreciated that each asset filter may be applied to all of the geospatial data included within the reference geospatial asset (e.g., all of the imagery, terrain and vector data) or only a subset of the geospatial data. Moreover, separate asset filters may be applied to each type of geospatial data, such as by having a separate asset filter for the imagery, terrain and vector datasets. Separate asset filters may also be tied to specific channels or layers of geospatial data.

In several embodiments, when an asset filter is associated with a specific ROI, the filter may be inclusionary or exclusionary in relation to the defined boundary for the ROI. Specifically, for an inclusionary asset filter, requests for data that overlap the ROI's boundary may be accepted. For instance, when quadtree addresses are being used to represent the ROI, any request for data associated with a quadtree address that is defined entirely within or that overlaps the ROI boundary may be accepted. However, for an exclusionary asset filter, requests for data that overlap the ROI boundary will be denied, such as by denying requests for data associated with quadtree addresses that are not defined entirely within the ROI.

Additionally, in several embodiments, each asset filter for a reference geospatial asset may be associated with an access point (e.g., a URL). For instance, a first filter may be created that is associated with a first access point and a second filter may be created that is associated with a second access point. In such an embodiment, when users access the reference geospatial asset using the first access point, the first filter may be applied to limit requests for data in a manner consistent with the filter parameters associated with the first filter. Similarly, when users access the reference geospatial asset using the second access point, the second filter may be applied to limit requests for data in a manner consistent with the filter parameters associated with the second filter. By associating each asset filter with a unique access point, a plurality of different filters may be applied to a single reference geospatial asset, thereby allowing varying access restrictions to be applied across a large number of different end user groups.

Moreover, in associating each asset filter with an access point, each access point may have its own security protocols. For instance, in one embodiment, an end user may be asked verify his/her identity by providing a username and/or password or the identity of an end user may be authenticated using any other suitable verification process, such as by identifying a unique user identification cookie or other identifier associated with the user's computing device. In such an embodiment, each asset filter may also be associated with one or more access control lists (ACLs) including a list of authorized or approved users for the filter.

As used herein, the term "geospatial asset" generally refers to any data that may be rendered or otherwise used by a GIS client, such as 2-D maps, 3-D globes, geospatial search data, updates to existing geospatial data and/or the like. In addition, the term "geospatial asset" may also include a GIS client, itself, such as an earth-browsing client or a mapping client or any other suitable client configured to utilize geospatial data. As is generally understood, a 2-D map may correspond to geospatial data that has been organized and indexed such that the data may be rendered over a two-dimensional surface. Similarly, a 3-D globe may generally correspond to geospatial data that has been organized and indexed such that the data may be rendered over a three-dimensional geometry representing the Earth's surface. For example, in one embodiment, a 3-D globe may be a directory hierarchy containing a number of packet bundles or files that may be used to serve imagery, terrain and vectors to an earth-browsing client. In such an embodiment, the 3-D globe may be a master globe including imagery, terrain and vector data or a portable globe including a smaller subset of the imagery, terrain and vector data forming the master globe. For instance, it should be appreciated that specific imagery, terrain and vector data (corresponding to, for example, a specific geographical region(s) of a 3-D globe) may be cut or selected from one 3-D globe and organized/indexed to form a different 3-D globe. Similarly, smaller subsets of the data forming a particular 2-D map may also be selected and organized/indexed to form a different 2-D map.

Additionally, as used herein, the term "reference geospatial asset" generally refers to any geospatial asset that is associated with one or more asset filters for limiting access to the geospatial data included within such asset. Thus, it should be appreciated that, in several embodiments, the reference geospatial asset may correspond to a master geospatial asset (e.g., a master globe or a master map) hosted by a master asset server. Alternatively, the reference geospatial asset may correspond to a portable geospatial asset that has been cut from or otherwise created based upon a master geospatial asset. In such an embodiment, the portable geospatial asset may be created using any suitable means and/or method known in the art. For instance, U.S. Pat. Pub. No. 2011/0205229 (Jagadev et al.), filed on Feb. 23, 2010 and entitled "Portable Globe Creation For a Geographical Information System," the disclosure of which is hereby incorporated by reference herein for all purposes, discloses a system and method for creating portable geospatial assets based on a master geospatial asset and transferring such assets from a master server to a local computing device.

It should also be appreciated that, in several embodiments of the present subject matter, the reference geospatial asset may be hosted by a remote web server, such as remote asset server. However, in alternative embodiments, the reference geospatial asset may be downloaded to a local server managed by an administrator or other user and served locally to end users. For instance, in one embodiment, the administrator may gain access to a master geospatial asset hosted by a remote server to create a reference geospatial asset having one or more asset filters associated therewith. Thereafter, the reference geospatial asset may be downloaded to a computing device configured to act as a local server. The administrator may then allow one or more groups of end users access to filtered versions of the reference geospatial asset via the local server.

Referring now to the drawings, FIG. 1 illustrates one embodiment of a system 100 for providing filtered geospatial assets in accordance with aspects of the present subject matter. As will be described below, the system 100 may allow for one or more asset filters to be created and associated with a reference geospatial asset. Thereafter, the asset filter(s) may be applied to the reference geospatial asset to limit the amount of geospatial data that may be accessed by a user(s). For instance, based on filter parameters associated with each asset filter, certain portions of the geospatial data may not be served to the user's device, thereby preventing the user from accessing the portions of the reference geospatial assert relating to such data.

As shown in FIG. 1, the system 100 may include a client-server architecture where a server 110 communicates with one or more clients, such as a local client device 140, over a network 160. The server 110 may generally be any suitable computing device, such as a remote web server(s) or a local server(s), and/or any combination of computing devices. For instance, the server 110 may be implemented as a parallel or distributed system in which two or more computing devices act together as single server. Similarly, the client device 140 may generally be any suitable computing device(s), such as a laptop(s), desktop(s), smartphone(s), tablet(s), mobile device(s), wearable computing device(s), a display with one or more processors coupled thereto and/or embedded therein and/or any other computing device(s). Although a single client device 140 is shown in FIG. 1, it should be appreciated that any number of clients may be connected to the server 110 over the network 160.

In several embodiments, the server 110 may host a GIS, such as a mapping application (e.g. the Google Maps mapping services provided by Google Inc.), a virtual globe application (e.g. the Google Earth virtual globe application provided by Google Inc.), or any other suitable geographic information system. On the client-side, the client device 140 may present a user interface that allows a user to interact with the GIS. For instance, the user interface may be served through a network or web-based application that is executed on the client device 140, such as a web browser, a thin client application or any other suitable network or web-based application or the user interface may be served locally on the client device 140. The server 110 may transmit data, such as a geospatial asset(s) and other data, over the network 160 to the client device 140. Upon receipt of this data, the client device 140 may present the geospatial asset(s), via the user interface, in a display device associated with the client device 140. A user may then access and/or interact with the geospatial asset presented in the user interface.

As shown in FIG. 1, the server 110 may include a processor(s) 112 and a memory 114. The processor(s) 112 may be any suitable processing device, such as a microprocessor, microcontroller, integrated circuit, or other suitable processing device. Similarly, the memory 114 may include any suitable computer-readable medium or media, including, but not limited to, non-transitory computer-readable media, RAM, ROM, hard drives, flash drives, or other memory devices. The memory 114 may store information accessible by processor(s) 112, including instructions 116 that can be executed by processor(s) 112 and data 118 that can be retrieved, manipulated, created, or stored by processor(s) 112. In several embodiments, the data 118 may be stored in one or more databases. For instance, as shown in FIG. 1, the memory 114 may include an asset database 120 for storing geospatial data associated with one or more geospatial assets, such as one or more 3-D globes, 2-D maps and/or any other suitable geospatial assets (e.g., search data). As will be described below, such geospatial asset(s) may correspond to one or more reference geospatial assets to which asset filters may be applied to limit the amount of geospatial data served to the client device 140.

The memory 114 may also include a filter database 122 for storing data associated with one or more asset filters. As will be described below, each asset filter may be associated with a reference geospatial asset stored on the asset database 120 and may include one or more filter parameters used for filtering the geospatial data associated with the reference geospatial asset. Thus, in several embodiments, the filter database 122 may include a data subset or folder for each asset filter that identifies the reference geospatial asset and the filter parameters for such filter. In addition, each data subset or folder may also include any access-related information associated with the corresponding asset filter, such as the access point associated with the filter and/or any ACL(s) associated with the filter.

As indicated above, the server 110 may be configured to host a GIS 130 that allows the server to communicate with a corresponding GIS client 150 running on the client device 140. Thus, in response to access requests transmitted by the client device 140, geospatial data associated with the geospatial asset(s) stored in the asset database 120 may be transmitted to the client device 140 to allow a user to navigate and/or interact with the geospatial asset(s). As shown in FIG. 1, in several embodiments, the instructions 116 stored within the memory 114 may be executed by the processor(s) 112 to implement a filter creation module 134 associated with the GIS 130. In general, the filter creation module 134 may be configured to allow for the creation of one or more asset filters to be associated with a given reference geospatial asset stored in the asset database 120. For instance, in several embodiments, the filter creation module 134 may be configured to provide a user interface (presented on the client device 140 via the GIS client 150) to enable a user to create a specific asset filter. The user interface may provide any number of tools that allow the user to navigate and display the reference geospatial asset. In addition, the user interface may provide a means for assigning one or more filter parameters to the asset filter being created, such as by selecting one or more ROIs and/or asset layers for the filter and/or by setting resolution levels for the filter.

Figure 2:
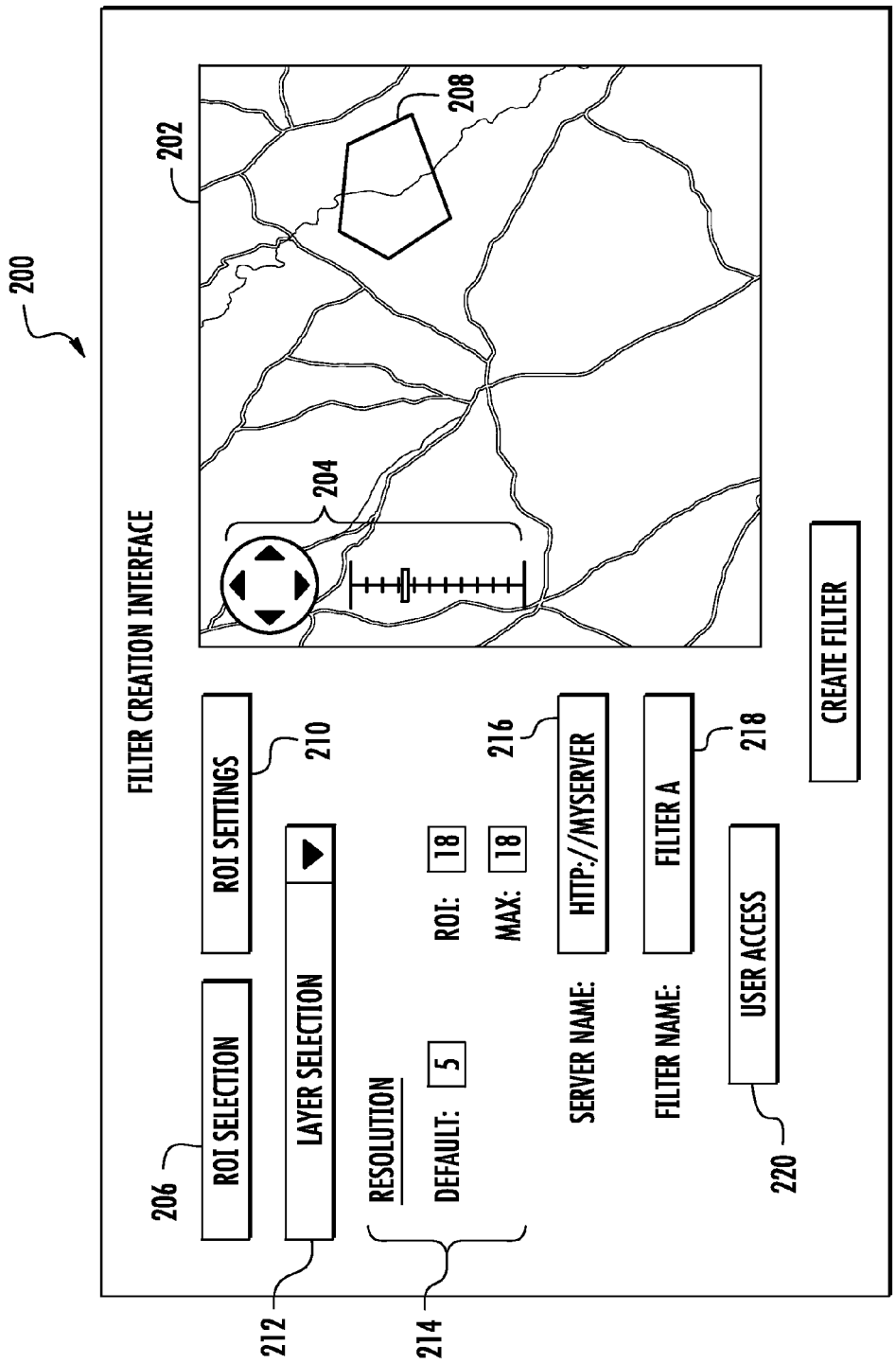
FIG. 2 illustrates one embodiment of a suitable user interface that may be utilized to create an asset filter in accordance with aspects of the present subject matter.

For instance, FIG. 2 illustrates one example of a suitable user interface 200 that may be provided by the filter creation module 132. As shown, the user interface 200 may include a display window 202 that allows the user to view all or a portion of the reference geospatial asset. Additionally, display tools 204 may be provided to allow the user to navigate and/or manipulate the reference geospatial asset (e.g., navigation and/or zoom buttons).

As shown in FIG. 2, the user interface 200 may also include an ROI selection button 206 to allow a user to select one or more ROIs for the reference geospatial asset by creating or drawing a shape that defines a boundary for each selected ROI. For instance, the user may be allowed to draw a polygon within the display portal 202 to select a specific ROI (e.g., region 208). In addition, the user interface 200 may include an ROI settings button 210 which may allow a user to adjust the settings for each selected ROI, such as by varying the shape of the polygon (e.g., to a rectangle, circle, etc.) or by adjusting whether the asset filter is inclusionary or exclusionary in relation to the boundary of the selected ROI.

Moreover, the user interface 200 may include a layer selection tool 212 to allow specific asset layers to be turned on and off. For instance, assuming the reference geospatial asset includes multiple asset layers (e.g., a "Building Names" layer, a "Building Layout" layer and a "User-Selected Points-of-Interest" layer), the layer selection tool 212 may be used to select which layers will be accessible when the corresponding asset filter is applied to the reference geospatial asset.

As shown in FIG. 2, the user interface 200 may also include input boxes 214 for setting the resolution level(s) at which all or a portion of the reference geospatial asset may be rendered once the asset filter is applied. For instance, the user may select a default resolution corresponding to the resolution level at which the entire reference geospatial asset may be capable of being rendered. In addition, the user may select a ROI resolution for each selected ROI corresponding to the resolution level at which such ROI may be rendered. For example, as shown in FIG. 2, the ROI resolution has been set at a significantly higher resolution level than the default resolution. As a result, when the corresponding asset filter is applied to the reference geospatial asset, any access requests to view portions of the reference geospatial asset not included within the ROI will be rendered at the lower default resolution. However, the geographic region associated with the ROI may be rendered at the ROI resolution to allow high resolution imagery to be viewed by the user. As will be described below, access to higher resolution date along the boundary of the selected ROI may vary depending on whether the asset filter is inclusionary or exclusionary.

It should be appreciated that, although the present subject matter will generally be described herein as providing higher resolution levels for selected ROIs, a user may instead select ROIs for which he/she desires to prevent access at higher resolutions. For instance, a user may set the ROI resolution for a specific ROI below the default resolution to prevent other users from viewing the ROI in any detail.

Moreover, the user interface 200 may also include an input box 216 that allows the user to specify a server name corresponding to the location or address at which the reference geospatial asset is being hosted and an input box 218 to specify a filter name for the asset filter being created. In such an embodiment, the characters input into the boxes 216, 218 may be utilized by the server 110 in associating a unique access point with the asset filter. Further, as shown in FIG. 2, the user interface 200 may include a user access button 220 that allows the user to specify which end users may be allowed to access the corresponding filtered version of the reference geospatial asset. The list of authorized users may then be stored within an ACL or other access list that is associated with the asset filter.

It should be appreciated that the user interface 200 shown in FIG. 2 is simply provided as one example of a suitable user interface for creating asset filters. It should also be appreciated that the user interface 200 may include any other suitable interface tools, buttons and/or the like for associating any other suitable filter parameters within the asset filter being created.

Referring back to FIG. 1, the instructions 116 stored within the memory 114 may also be executed by the processor(s) 112 to implement a filter application module 134 associated with the GIS 130. In general, the filter application module 134 may be configured to apply a given asset filter to the reference geospatial asset to allow a filtered version of the asset to be generated and served to the client device 140. Specifically, by removing or disregarding geospatial data included within reference geospatial asset based on the filter parameters associated with the specific asset filter being applied, a filtered version of the asset may be dynamically created and served that corresponds to a data subset of the reference geospatial asset. For instance, if the GIS 130 is configured to serve 3-D globes, a reference geospatial asset may be stored within the asset database 120 that corresponds to a high resolution, multi-level globe including geospatial data, such as imagery, terrain and vector data, that has been fused together to create a large, navigable globe. Thus, a filtered version of the reference geospatial asset may be provided by the server 110, for example, by selectively serving geospatial data included within the asset based on the relevant filter parameters. Specifically, if the asset filter provides for a specific ROI to be rendered at a given ROI resolution level and the remainder of the reference geospatial asset to be rendered at a default resolution level, the filter application module 134 may be configured to remove or disregard any geospatial data needed to render the asset at resolutions above the specified levels. The resulting filtered version of the reference geospatial asset may then be served to the client device 140.

It should be appreciated that, as used herein, the term "module" refers to computer logic utilized to provide desired functionality. Thus, a module may be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

Additionally, as shown in FIG. 1, the server 110 may also include a network interface 136 for providing communications over the network 160. In general, the network interface 126 may be any device/medium that allows the server 110 to interface with the network 160.

Similar to the server 110, the client device 140 may also include one or more processors 142 and associated memory 144. The processor(s) 142 may be any suitable processing device known in the art, such as a microprocessor, microcontroller, integrated circuit, or other suitable processing device. Similarly, the memory 144 may be any suitable computer-readable medium or media, including, but not limited to, non-transitory computer-readable media, RAM, ROM, hard drives, flash drives, or other memory devices. As is generally understood, the memory 144 may be configured to store various types of information, such as data 146 that may be accessed by the processor(s) 142 and instructions 148 that may be executed by the processor(s) 142. The data 146 may generally correspond to any suitable files or other data that may be retrieved, manipulated, created, or stored by processor(s) 142. In several embodiments, the data 146 may be stored in one or more databases.

The instructions 148 stored within the memory 144 of the client device 140 may generally be any set of instructions that, when executed by the processor(s) 142, cause the processor(s) 142 to provide desired functionality. For example, the instructions 148 may be software instructions rendered in a computer readable form or the instructions may be implemented using hard-wired logic or other circuitry. In several embodiments, suitable instructions may be stored within the memory 144 for implementing one or more GIS clients 150, such as one or more earth-browsing clients and/or mapping clients, designed to render geospatial assets. For instance, the GIS client(s) 150 may be configured to retrieve geospatial assets from the server 110 and render such assets for display/use by the user. For example, the GIS client(s) 150 may be configured to present the user with the user interface 200 described above to allow the user to associate one or more asset filters with a reference geospatial asset. Alternatively, the GIS client(s) 150 may be configured to present any other suitable user interface that allows a user to interact with geospatial assets retrieved from the server 110. In addition, the GIS client(s) 150 may also be configured to render geospatial assets stored within the device's memory 144, such as portable geospatial assets stored within a database of the memory 144.

Moreover, as shown in FIG. 1, the client device 140 may also include a network interface 152 for providing communications over the network 160. Similar to the interface 136 for the server 110, the network interface 152 may generally be any device/medium that allows the client device 140 to interface with the network 160.

It should be appreciated that the network 160 may be any type of communications network, such as a local area network (e.g. intranet), wide area network (e.g. Internet), or some combination thereof. The network can also include a direct connection between the client device 140 and the server 110. In general, communication between the server 110 and the client device 140 may be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Figure 3:
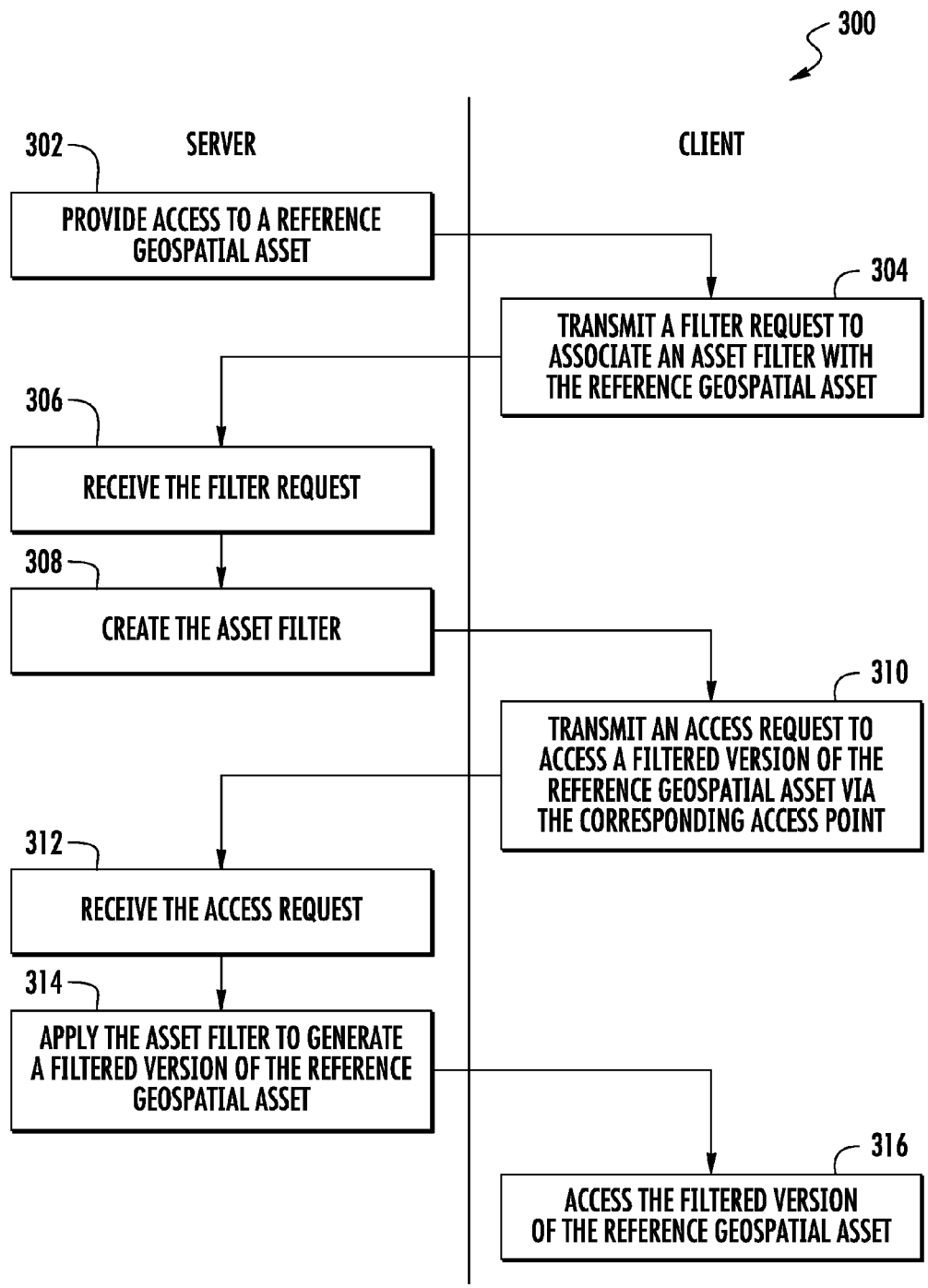
FIG. 3 illustrates a flow diagram of one embodiment of a method for providing filtered geospatial assets in accordance with aspects of the present subject matter.

Referring now to FIG. 3, a client-server flow diagram of one embodiment of a method 300 for providing filtered geospatial assets is illustrated in accordance with aspects of the present subject matter. The method 300 will generally be discussed herein with reference to the system 100 shown in FIG. 1. However, those of ordinary skill in the art, using the disclosures provided herein, should appreciate that the methods described herein may be executed by any computing device or any combination of computing devices. Additionally, it should be appreciated that, although the method elements 302-316 are shown in FIG. 3 in a specific order, the various elements of the disclosed method 300 may generally be performed in any suitable order that is consistent with the disclosure provided herein.

At (302), the server 110 provides access to a reference geospatial asset. For instance, as indicated above, the server 110 may include an asset database 120 for storing one or more reference geospatial assets, such as one or more master or portable geospatial assets. Additionally, as indicated above, the server 110 may be configured to host a GIS 130 (e.g., a mapping application, a virtual globe application and/or any other suitable application capable of rendering the reference geospatial asset). As such, the server 110 may be configured to provide access to the reference geospatial asset by serving or otherwise making available the asset to a suitable GIS client 150 executed on the client device 140. It should be appreciated that the server 110 may correspond to the original server on which the filters were created (e.g., a remote asset server) or a separate server onto which the reference geospatial asset and associated filters were subsequently downloaded (e.g., a local server).

At (304), a filter request is transmitted to the server 110 to associate an asset filter with the reference geospatial asset. For instance, as indicated above, the server 110 may be configured to implement a filter creation module 132 that allows for one or more asset filters to be created and associated with a reference geospatial asset. In such an embodiment, the GIS client 150 implemented on the client device 140 may be configured to present a suitable user interface to allow the user to transmit the request to associate one or more asset filters with the reference geospatial asset. For instance, referring back to FIG. 2, a suitable user interface 200 may allow a user to select one or more ROIs for the reference geospatial asset, turn on/off asset layers, vary the resolution settings, provide server and filter names, identify end users authorized to access the corresponding filtered version of the asset and/or provide any other suitable filter parameters. Specifically, as shown in FIG. 2, the user has selected a ROI 208 by drawing a polygon around the desired geographic region within the reference geospatial asset. In addition, the user has set a resolution level for the ROI 208 that is higher than the default resolution level set for the remainder of the reference geospatial asset.

At (306) and (308), the filter request is received by the server 110 and the corresponding asset filter is created. For instance, upon receipt of the filter request, a new data subset or folder may be created and stored with the server's filter database 122 that includes the filter parameters associated with the filter request (e.g., by storing any ROI selections, layer selections, resolution settings, authorized user lists, etc.). In addition, the server 110 may be configured to associate a unique access point with the newly created asset filter. For example, in one embodiment, the server 110 may associate a unique URL with the asset filter that has a character string including all or portions of the server and/or filter name provided in the filter request. The access point may then serve as the means for subsequently accessing the corresponding filtered version of the reference geospatial asset.

At (310), an access request is transmitted to the server 110 to access the reference geospatial asset with the filtered applied thereto (i.e., a filtered version of the asset). The access request may be transmitted using the access point associated with the asset filter. For instance, in several embodiments, the GIS client 150 running on the client device 140 may transmit an access request using the specific URL associated with the asset filter.

At (312) and (314), the access request is received by the server 110 and the asset filter is applied to the reference geospatial asset in order to generate a filtered version of the reference geospatial asset. For instance, upon receipt of the access request, the server 110 may access the filter database 122 to determine which asset filter is associated with the access point provided in the access request. The server 110 may then apply the asset filter to allow the filtered version of the reference geospatial asset to be served on the client device 140. As indicated above, in several embodiments, the server 110 may be configured to implement a filter application module 134 that dynamically creates the filtered version of the reference geospatial asset by removing or disregarding geospatial data based on the filter parameters included within the specific asset filter being applied. For instance, given the filter parameters shown in FIG. 2, the filter application module 134 may be configured to remove or disregard any geospatial data that is necessary to render the portions of the reference geospatial asset that are outside the defined ROI 208 at resolution levels above the default resolution.

At (316), the filtered version of the reference geospatial asset is accessed by the client device 140. Specifically, as indicated above, the filtered version of the reference geospatial asset may be served on the GIS client 150 executed on the client device 140. The GIS client 150 may then render the filtered version to allow the user to interact with and/or navigate the asset. Alternatively, the reference geospatial asset, together with the corresponding asset filter(s), may be downloaded onto the client device 140. In such an embodiment, the client device 140 may, for example, be configured to act a local server for providing access to the reference geospatial asset and/or filtered version(s) of the asset to one or more groups of end users.

It should be appreciated that, by allowing the filtered version(s) of the reference geospatial asset to be served on the client device 140, an administrator or other user may be allowed to preview the filtered version(s) prior to downloading the reference geospatial asset and its associated filters. For instance, as will be described below, the perceived rate of blurring outside a selected ROI is dependent on the location of the polygon or other boundary defining the ROI in relation to the location of the quadtree boundaries at a given resolution level. Thus, by providing access to the filtered version(s) of the reference geospatial asset, a user may verify that an ROI is properly defined within the asset and is being rendered consistent with the user's intentions. If not, the user may adjust the filter parameters associated with the asset filter to re-define the ROI and its settings. Once the ROI definition is appropriate, the user may then download the reference geospatial asset and its associated filters.

Such previewing may be particularly advantageous for users that desire to locally serve filtered geospatial assets, such as users of the Google Earth Enterprise services offered by Google, Inc. For instance, an administrative user may access a remote asset server to create asset filters associated with a geospatial asset provided by the remote server. The administrative user may then individually preview the filtered versions of the geospatial asset using the specific access point associated with each asset filter. Once previewed, the administrative user may download the geospatial asset and its corresponding asset filters to his/her computing device, which may then be used as a local server to provide access to the filtered versions of the asset. For instance, the administrative user may publish each access point to a specific group of end users, thereby allowing the administrative user to control exactly how the geospatial asset may be viewed by each end user.

Additionally, since an asset filter can embody the same parameters that would be used for cutting a portable geospatial asset from a master geospatial asset, previewing filtered versions of the master geospatial asset may also serve as a means for previewing the portable geospatial assets that are capable of being created form the master geospatial asset. As a result, a user may preview the portable geospatial asset(s) before investing the time and storage space required to actually cut the asset(s) from the master geospatial asset.

Figure 4:
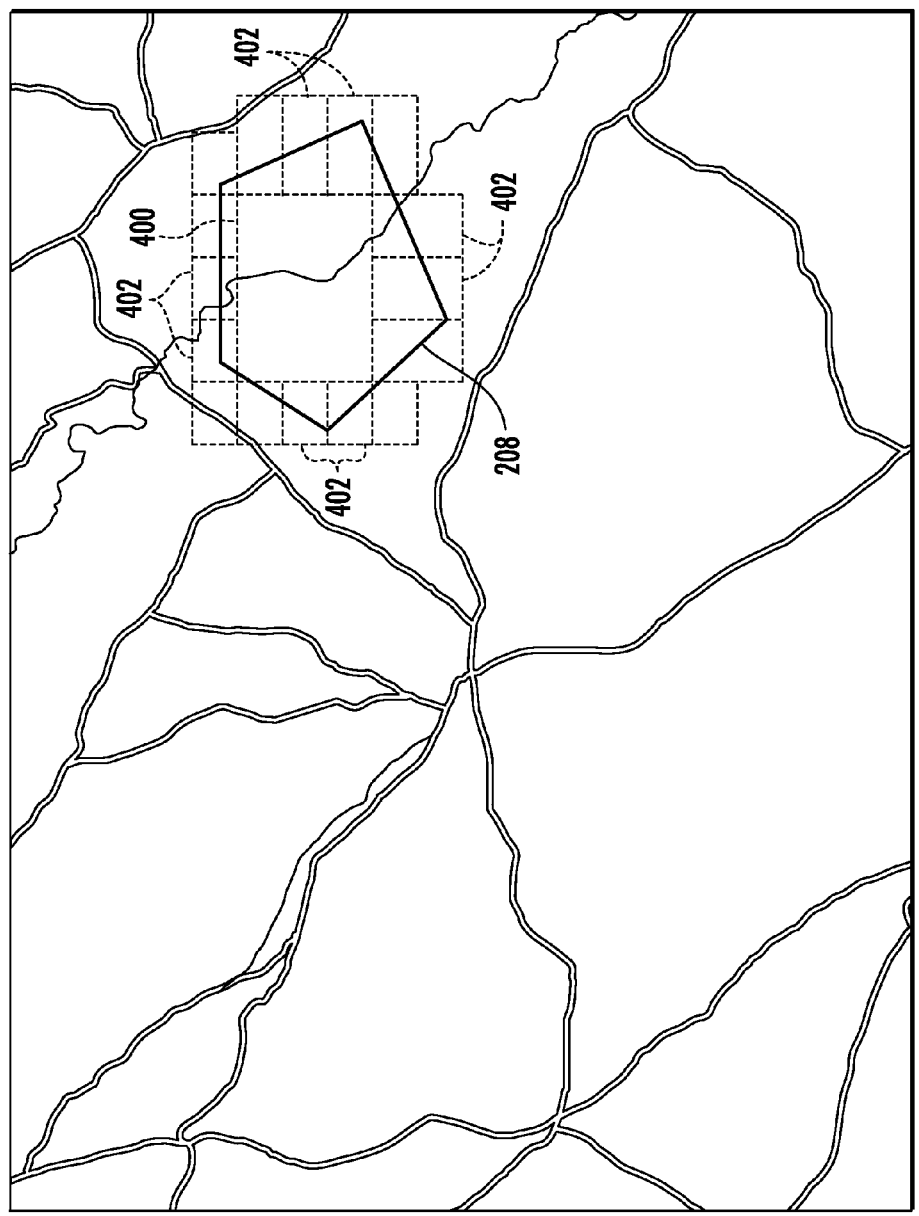
FIG. 4 illustrates an enlarged view of the portion of the reference geospatial asset shown in FIG. 2, particularly illustrating a selected ROI that is included within a filter associated with the asset.

As indicated above, the perceived resolution outside a selected ROI is dependent on the location of the ROI boundary in relation to the location of the boundaries of the quadtree nodes at a given resolution level. As is generally understood, a quadtree is a data structure in which each internal node has up to four recursively subdivided regions. For instance, a number of quadtree nodes may exist for a given resolution level. If a higher resolution level is available, the next resolution level may have four quadtree nodes for each node that was included within the lower resolution level. For example, FIG. 4 illustrates an enlarged view of the portion of the reference geospatial asset shown in the display portal 202 of FIG. 2, particularly illustrating the asset with the ROI boundary shown for description purposes. As shown in FIG. 4, the polygon defining the selected ROI 208 is represented by a plurality of quadtree nodes 400, 402, with each node being represented by a dashed box. Assuming that a user has submitted a request to view the reference geospatial asset at a resolution level above the default resolution, it must be determined which portions of the asset are to be included within the ROI 208 (and, thus, rendered at the higher resolution) and which portions of the asset are outside the ROI 208 (and, thus, rendered at a lower resolution). For an inclusionary filter, each quadtree node 400, 402 that is either defined entirely within the ROI boundary (e.g., node 400) or overlaps the ROI boundary (e.g., nodes 402) is considered part of the ROI 208. Thus, in the view of FIG. 4, the geographic region encompassed within all of the quadtree nodes 400, 402 may be considered part of the selected ROI 208 and, thus, may be rendered at the higher resolution. However, for an exclusionary filter, only the quadtree nodes that are defined entirely within the ROI boundary are considered part of the ROI 208. Thus, in the view of FIG. 4, only the geographic region bounded by quadtree node 400 may be rendered at the higher resolution, with the remainder of the geospatial asset being rendered at a lower resolution.

By configuring an asset filter to be exclusionary in relation to the defined boundary of an ROI, it can be ensured that geographic regions within the reference geospatial asset that are outside the ROI boundary (but are defined within an overlapping quadtree node) are not capable of being rendered at resolutions above the default resolution. As a result, a user can be ensured that sensitive or restricted areas bordering the selected ROI will only be served or available at a limited resolution.

Figure 5:
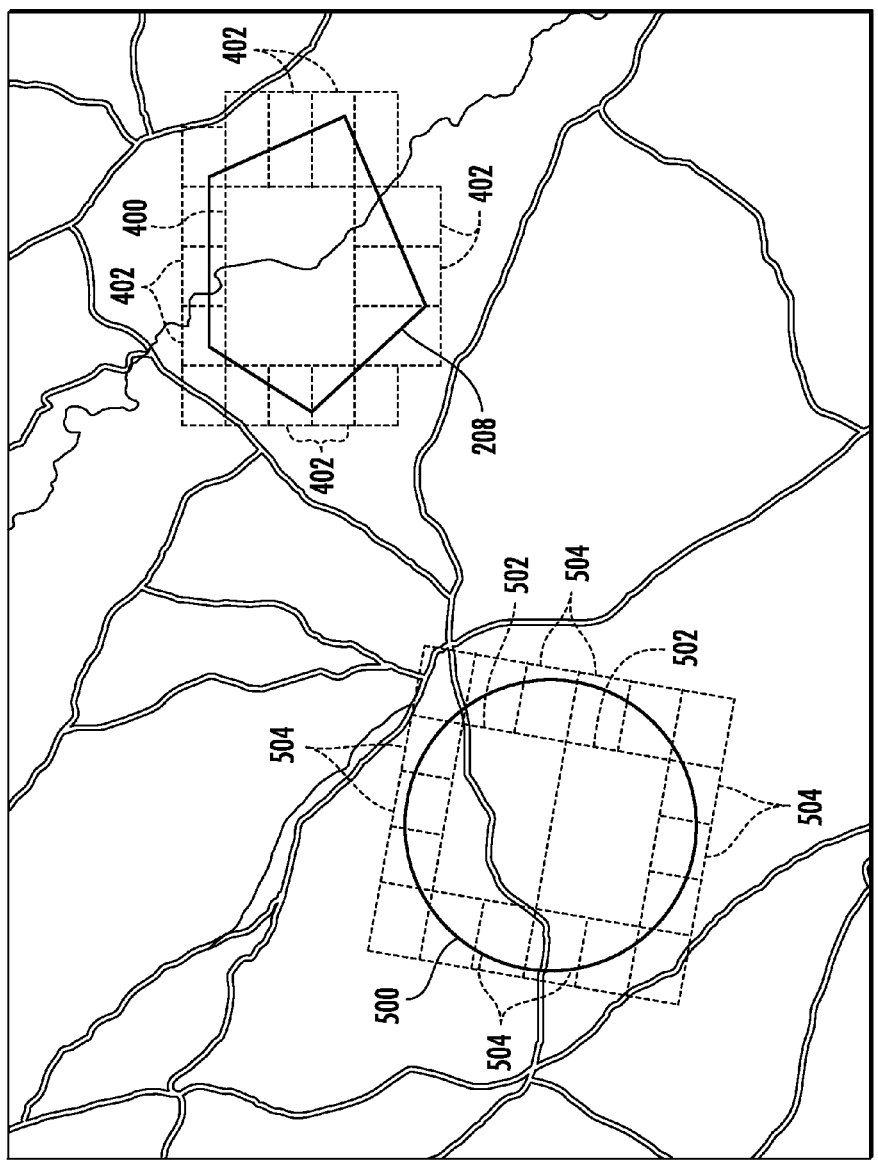
FIG. 5 illustrates another enlarged view of the portion of the reference geospatial asset shown in FIG. 2, particularly illustrating two selected ROIs that are included within a different filter associated with the asset.

It should be appreciated that, although only a single filter request was described above with reference to FIG. 3, a user may submit a plurality of different filter requests in order to create a plurality of different asset filters for a given reference geospatial asset. For instance, the selected ROI shown in FIG. 4 may form part of the filter parameters included within a first filter created for the reference geospatial asset. Thus, users accessing the reference geospatial asset via the access point associated with the first filter may be allowed to view the selected ROI 208 at a higher resolution than the remainder of the asset. On the other hand, FIG. 5 illustrates selected ROIs 208, 500 included within a second filter created for the reference geospatial asset. As shown, the second filter includes both the ROI 208 associated with the first filter and another ROI 500. Accordingly, users accessing the reference geospatial asset via the access point associated with the second filter may be allowed to view both ROIs 208, 500 at higher resolutions than the remainder of the asset. As indicated above, by associating each filter with a unique access point, a first group of end users may be authorized to access the first filter while a different group of end users may be authorized to access the second filter, thereby allowing user access to be specifically tailored to each end user group.

It should also be appreciated that, similar to that described above with reference to FIG. 4, access to the selected ROI 500 shown in FIG. 5 may vary depending on whether the corresponding asset filter is configured to be inclusionary or exclusionary. Specifically, for an inclusionary filter, the quadtree nodes 502 defined entirely within the ROI boundary and the quadtree nodes 504 overlapping the ROI boundary may be considered part of the ROI 500 for the current resolution level. However, for an exclusionary filter, only the quadtree nodes 502 defined entirely within the ROI boundary may be considered part of the ROI 500 for the current resolution level.

Figure 6:
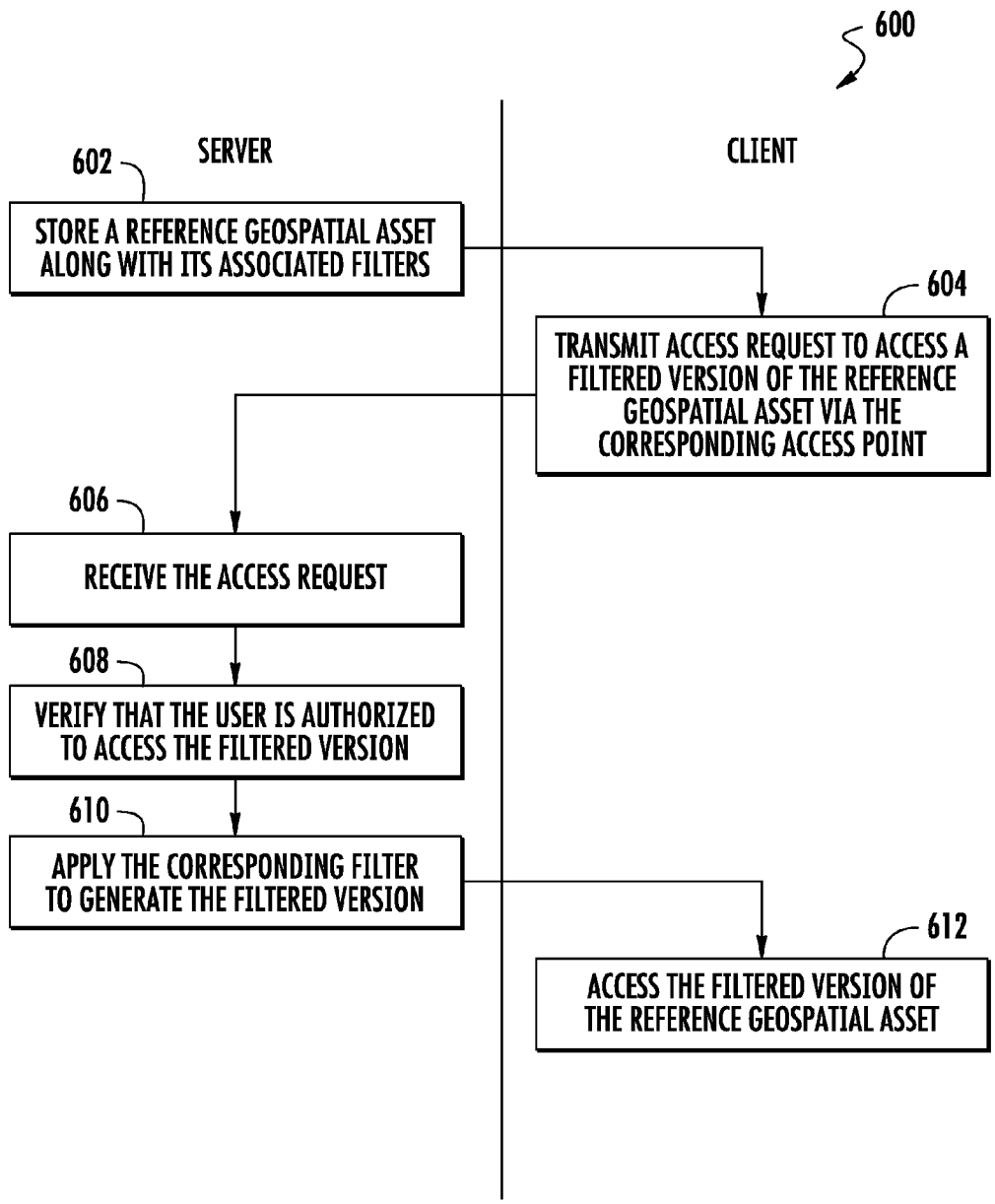
FIG. 6 illustrates a flow diagram of another embodiment of a method for providing filtered geospatial assets in accordance with aspects of the present subject matter.

Referring now to FIG. 6, a client-server flow diagram of another embodiment of a method 600 for providing filtered geospatial assets is illustrated in accordance with aspects of the present subject matter. The method 600 will generally be discussed herein with reference to the system 100 shown in FIG. 1. However, those of ordinary skill in the art, using the disclosures provided herein, should appreciate that the methods described herein may be executed by any computing device or any combination of computing devices. Additionally, it should be appreciated that, although the method elements 602-612 are shown in FIG. 6 in a specific order, the various elements of the disclosed method 600 may generally be performed in any suitable order that is consistent with the disclosure provided herein.

At (602), a reference geospatial asset is stored on the server 110 along with its associated filters. For instance, as indicated above, the server 110 may include one or more databases (e.g., an asset database 120 and a filter database 122) within which the reference geospatial asset and filters may be stored. It should be appreciated that the server 110 may correspond to the original server on which the filters were created (e.g., a remote asset server) or a separate server onto which the reference geospatial asset and associated filters were subsequently downloaded (e.g., a local server).

At (604), an access request is transmitted to the server 110 for accessing a filtered version of the reference geospatial asset. For example, as described above, each asset filter may be associated with a unique access point. Thus, in several embodiments, the GIS client 150 running on the client device 140 may use the access point associated with the asset filter to request access to the corresponding filtered version of the reference geospatial asset.

At (606), the access request is received. Thereafter, at (608), the server 110 may verify that the user transmitting the access request is authorized to access the filtered version of the reference geospatial asset. For instance, the server 110 may verify the user's identity by transmitting a request for the user to provide his/her username and/or password or by identifying a unique user identification cookie or other identifier associated with the client device 140. The server may then access the ACL(s) or other suitable access list(s) associated with the asset filter to verify that the user is authorized to access the filter version of the asset.

If it is verified that the access request was received from an authorized user, at (610), the server 110 may be configured to apply the asset filter associated with the access point used in connection with the access request to generate the corresponding filtered version of the reference geospatial asset. The filtered version may then be served on the GIS client 150 running on the client device 140 to allow a user, at (612), to navigate/interact or otherwise access such filtered version of the asset.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for providing filtered geospatial assets, the method comprising:
    receiving, by one or more computing devices, a filter request to associate a filter with a reference geospatial asset, the reference geospatial asset including geospatial data, the filter request including at least one filter parameter associated with limiting access to a portion of the geospatial data, the at least one filter parameter including a selected region of interest (ROI),
    receiving, by the one or more computing devices, an access request to access a filtered version of the reference geospatial asset, wherein the access request is associated with an access point associated with the filter; and
    applying, by the one or more computing devices, the filter to the reference geospatial asset to generate the filtered version of the reference geospatial asset, the selected ROI being represented within the filtered version by a plurality of region nodes, at least a portion of the plurality of the region nodes overlapping a boundary defining the selected ROI, wherein the filtered version provides access to only a portion of the geospatial data contained within the reference geospatial asset,
    wherein the filter is inclusionary in relation to the boundary such that the at least a portion of the plurality of region nodes overlapping the boundary are included within the selected ROI for purposes of applying the filter or the filter is exclusionary in relation to the boundary such that the at least a portion of the plurality of region nodes overlapping the boundary are not included within the selected ROI for purposes of applying the filter.

2. The method of claim 1, wherein applying the filter to the reference geospatial asset comprises restricting access to portions of the geospatial data associated with rendering geographic regions of the reference geospatial asset that are not included within the selected ROI at a resolution level above a default resolution.

3. The method of claim 2, further comprising providing access to portions of the geospatial data associated with rendering geographic regions of the reference geospatial asset included within the selected ROI at a resolution level that differs from the default resolution.

4. The method of claim 1, wherein the at least one filter parameter further includes an access list of users authorized to access the filtered version of the reference geospatial asset.

5. The method of claim 4, further comprising verifying that the access request is transmitted by a user that is included within the access list.

6. The method of claim 1, wherein the plurality of region nodes correspond to a plurality of quadtree nodes.

7. The method of claim 1, the plurality of region nodes further including at least one region node defined entirely within the boundary, the at least one region node being included within the selected ROI regardless of whether the filter is inclusionary or exclusionary.

8. A system for providing filtered geospatial assets, the system comprising:
one or more computing devices including one or more processors and associated memory, the memory storing instructions that, when executed by the one or more processors, configure the one or more computing devices to:
receive a first filter request to associate a first filter with a reference geospatial asset, the reference geospatial asset including geospatial data, the first filter request including at least one filter parameter associated with limiting access to a first portion of the geospatial data, the at least one filter parameter including a first selected region of interest (ROI),
receive a second filter request to associate a second filter with the reference geospatial asset, the second filter request including at least one filter parameter associated with limiting access to a second portion of the geospatial data, the at least one filter parameter including a second selected region of interest (ROI),
receive an access request to access a filtered version of the reference geospatial asset, wherein the access request is associated with an access point associated with the first filter request; and
apply the first filter to the reference geospatial asset based on the access request to generate the filtered version of the reference geospatial asset, the first selected ROI being represented within the filtered version by a plurality of region nodes, at least a portion of the plurality of the region nodes overlapping a boundary defining the first selected ROI, wherein the filtered version provides access to only a portion of the geospatial data contained within the reference geospatial asset,
wherein the first filter is inclusionary in relation to the boundary such that the at least a portion of the plurality of region nodes overlapping the boundary are included within the first selected ROI for purposes of applying the first filter or the first filter is exclusionary in relation to the boundary such that the at least a portion of the plurality of region nodes overlapping the boundary are not included within the first selected ROI for purposes of applying the first filter.

9. The system of claim 8, wherein the one or more computing devices are further configured to restrict access to portions of the geospatial data associated with rendering geographic regions of the reference geospatial asset that are not included within the first selected ROI at a resolution level above a default resolution.

10. The system of claim 9, wherein the one or more computing devices are further configured to provide access to portions of the geospatial data associated with rendering geographic regions of the reference geospatial asset included within the first selected ROI at a resolution level that differs from the default resolution.

11. The system of claim 8, wherein the at least one filter parameter for the first filter request or the second filter requests further includes an access list of users authorized to access the filtered version of the reference geospatial asset, wherein the one or more computing devices are further configured to verify that the access request is transmitted by a user that is included within the access list.

12. The system of claim 8, wherein the plurality of region nodes correspond to a plurality of quadtree nodes.

13. The system of claim 8, the plurality of region nodes further including at least one region node defined entirely within the boundary, the at least one region node being included within the first selected ROI regardless of whether the first filter is inclusionary or exclusionary.

14. A tangible, non-transitory computer-readable medium storing computer-executable instructions that, when executed by one or more processors, cause the one or more processors to perform operations, comprising:
storing a reference geospatial asset, the reference geospatial asset including geospatial data and being associated with a filter, the filter including at least one filter parameter for limiting access to a portion of the geospatial data, the at least one filter parameter including a selected region of interest (ROI);
receiving an access request to access a filtered version of the reference geospatial asset, wherein the access request is associated with an access point associated with the filter;
applying the filter to the reference geospatial asset to generate the filtered version of the reference geospatial asset, the selected ROI being represented within the filtered version by a plurality of region nodes, at least a portion of the plurality of the region nodes overlapping a boundary defining the selected ROI, wherein the filtered version provides access to only a portion of the geospatial data contained within the reference geospatial asset
wherein the filter is inclusionary in relation to the boundary such that the at least a portion of the plurality of region nodes overlapping the boundary are included within the selected ROI for purposes of applying the filter or the filter is exclusionary in relation to the boundary such that the at least a portion of the plurality of region nodes overlapping the boundary are not included within the selected ROI for purposes of applying the filter.

15. The computer readable medium of claim 14, wherein the operation of applying the filter to the reference geospatial asset comprises restricting access to portions of the geospatial data associated with rendering geographic regions of the reference geospatial asset that are not included within 3 the selected ROI at a resolution level above a default resolution.

16. The computer readable medium of claim 15, further comprising the operation of providing access to portions of the geospatial data associated with rendering geographic regions of the reference geospatial asset included within the selected ROI at a resolution level that differs from the default resolution.

17. The computer readable medium of claim 14, wherein the at least one filter parameter further includes an access list of users authorized to access the filtered version of the reference geospatial asset.

18. The computer readable medium of claim 17, further comprising the operation of verifying that the access request is transmitted by a user that is included within the access list.

19. The computer readable medium of claim 14, wherein the plurality of region nodes correspond to a plurality of quadtree nodes.

20. The computer readable medium of claim 14, the plurality of region nodes further including at least one region node defined entirely within the boundary, the at least one region node being included within the selected ROI regardless of whether the filter is inclusionary or exclusionary.

* * * * *